United States Patent
Hughes et al.

(10) Patent No.: US 6,535,484 B1
(45) Date of Patent: *Mar. 18, 2003

(54) METHOD AND APPARATUS FOR PER TRAFFIC FLOW BUFFER MANAGEMENT

(75) Inventors: David A. Hughes, Mountain View, CA (US); Daniel E. Klausmeier, Sunnyvale, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/490,548

(22) Filed: Jan. 24, 2000

Related U.S. Application Data

(63) Continuation of application No. 08/648,556, filed on May 15, 1996, now Pat. No. 6,034,945.

(51) Int. Cl.⁷ .............................................. H04L 12/56
(52) U.S. Cl. ........................ 370/230; 370/235; 370/412
(58) Field of Search .............................. 370/229–234, 370/252, 253, 389, 392, 395–397, 400, 409, 412, 415, 416, 395.2, 395.21; 711/130, 147, 150, 151, 153, 163, 165, 166, 170–173

(56) References Cited

U.S. PATENT DOCUMENTS

| | | | |
|---|---|---|---|
| 4,430,712 A | | 2/1984 | Coulson et al. ............. 711/173 |
| 4,849,968 A | * | 7/1989 | Turner ......................... 370/412 |
| 5,014,265 A | | 5/1991 | Hahne et al. ................ 370/236 |
| 5,157,654 A | | 10/1992 | Cisneros |

(List continued on next page.)

FOREIGN PATENT DOCUMENTS

EP    0706298 A2    10/1996

OTHER PUBLICATIONS

Massound R. Hashemi and Alberto Leon–Garcia, "A General Purpose Cell Sequencer/Scheduler for ATM Switches," Department of Electrical and Computer Engineering, University of Toronto, pp. 29–37 (1997).

H. Jonathon Chao and Donal E. Smith, "Design of Virtual Channel Queue In An ATM Broadband Terminal Adaptor," INFOCOM '92, pp. 294–302 (1992).

PCT Notification of Transmittal of The International Search Report or The Declaration for PCT Counterpart Application No. PCT/US97/07839 Containing International Search Report (Sep. 18, 1997).

Kenji Kawahara et al., "Performance Evaluation of Selective Cell Discard Schemes in ATM Networks", 1996 IEEE, Mar. 24, 1996, pp. 1054–1061.

Voshihiro Ohba et al., "Dynamic Threshold Control for Shared Buffer ATM Switching" Technical Report of IEICE, SSE95–12.

*Primary Examiner*—Seema S. Rao
(74) *Attorney, Agent, or Firm*—Blakely, Sokoloff, Taylor & Zafman LLP

(57) ABSTRACT

A method of managing oversubscription of a common buffer resource shared by a number of traffic flows in a cell switching network in response to the utilization of the common buffer resource. A buffer utilization threshold is established for each of the traffic flows. As new cells arrive, the global usage of the buffer resource is monitored. As the buffer utilization increases, the thresholds for each of the traffic flows are dynamically adjusted based upon the global usage of the buffer. Aggressive buffer allocations are scaled back when necessary, thereby leaving space for traffic flows which are relatively empty. In one embodiment, the thresholds are coded in mantissa and exponent form so that the scaling is accomplished by adjusting the exponent value.

10 Claims, 8 Drawing Sheets

U.S. PATENT DOCUMENTS

| | | |
|---|---|---|
| 5,274,768 A | 12/1993 | Traw et al. |
| 5,303,078 A | 4/1994 | Brackett et al. |
| 5,311,509 A | 5/1994 | Heddes et al. |
| 5,313,454 A | 5/1994 | Bustini et al. |
| 5,359,592 A | 10/1994 | Corbalis et al. |
| 5,379,297 A | 1/1995 | Glover et al. |
| 5,412,655 A | 5/1995 | Yamada et al. |
| 5,434,848 A | 7/1995 | Chimento, Jr. et al. ..... 370/232 |
| 5,499,238 A | 3/1996 | Shon ......................... 370/415 |
| 5,517,643 A | 5/1996 | Davy ......................... 711/173 |
| 5,530,698 A | 6/1996 | Kozaki et al. |
| 5,539,899 A | 7/1996 | Huynh et al. ............... 711/171 |
| 5,541,912 A | 7/1996 | Choudhury et al. ........ 370/416 |
| 5,541,919 A | 7/1996 | Young et al. ............... 370/416 |
| 5,542,068 A | 7/1996 | Peters ......................... 703/27 |
| 5,546,389 A | 8/1996 | Wippenbeck et al. ....... 370/412 |
| 5,548,587 A | 8/1996 | Bailey et al. |
| 5,550,823 A | 8/1996 | Irie et al. |
| 5,555,264 A | 9/1996 | Sallberg et al. ............. 370/414 |
| 5,557,604 A | 9/1996 | Usumi et al. |
| 5,557,607 A | 9/1996 | Holden |
| 5,568,477 A | 10/1996 | Galand et al. |
| 5,570,362 A | 10/1996 | Nishimura |
| 5,584,015 A * | 12/1996 | Villette et al. .............. 711/136 |
| 5,600,820 A | 2/1997 | Johnston .................... 370/395 |
| 5,617,416 A | 4/1997 | Damien ...................... 370/416 |
| 5,625,625 A | 4/1997 | Oskouy et al. |
| 5,633,861 A | 5/1997 | Hanson et al. |
| 5,680,582 A | 10/1997 | Slayden ...................... 711/171 |
| 5,701,495 A | 12/1997 | Arndt et al. |
| 5,704,047 A | 12/1997 | Schneeberger |
| 5,742,606 A | 4/1998 | Iliadis et al. |
| 5,742,765 A | 4/1998 | Wong et al. |
| 5,765,032 A | 6/1998 | Valizadeh |
| 5,768,275 A | 6/1998 | Lincoln et al. |
| 5,793,747 A | 8/1998 | Kline |
| 5,796,735 A | 8/1998 | Miller et al. |
| 5,812,527 A | 9/1998 | Kline et al. |
| 5,838,677 A | 11/1998 | Kozaki et al. |
| 5,844,901 A | 12/1998 | Holden et al. |
| 5,850,395 A | 12/1998 | Hauser et al. |
| 5,854,911 A | 12/1998 | Watkins |
| 5,875,352 A | 2/1999 | Gentry et al. |
| 5,898,688 A | 4/1999 | Norton et al. |
| 5,901,147 A | 5/1999 | Joffe |
| 5,970,064 A | 10/1999 | Clark et al. |
| 5,974,466 A | 10/1999 | Mizutani et al. |
| 5,978,856 A | 11/1999 | Jones |
| 5,982,783 A | 11/1999 | Frey et al. |
| 5,999,518 A | 12/1999 | Nattkemper et al. |
| 5,999,533 A | 12/1999 | Peres et al. |
| 6,011,775 A | 1/2000 | Bonomi et al. |
| 6,028,844 A | 2/2000 | Hao et al. |
| 6,034,945 A | 3/2000 | Hughes et al. |
| 6,058,114 A | 5/2000 | Sethuram et al. |
| 6,084,882 A | 7/2000 | Bailey et al. |

* cited by examiner

METHOD AND APPARATUS FOR PER TRAFFIC FLOW BUFFER MANAGEMENT

This is a continuation of application Ser. No. 08/648,556, filed on May 15, 1996 now U.S. Pat. No. 6,034,945.

FIELD OF THE INVENTION

The present invention relates generally to the field of cell switching network communications and, more specifically, to the efficient management of shared buffer resources within such a network.

BACKGROUND

The desire to integrate data, voice, image and video over high speed digital trunks has led to the development of a packet switching technique called cell relay or asynchronous transfer mode (ATM). ATM traffic is switched and multiplexed in fixed length cells and an ATM network typically provides a number of interconnected nodes which are capable of receiving data from other network nodes and forwarding that data through to other network nodes to its ultimate destination. Nodes are interconnected by transmission paths, each of which supports one or more virtual paths. Each virtual path contains one or more virtual channels. Switching can be performed at the transmission path, virtual path or virtual channel level.

Network nodes generally employ buffering schemes to prevent contention for switch resources (e.g., ports). In the past, this has included relatively unsophisticated solutions, such as a first-in-first-out (FIFO) queue at each port. This solution quickly leads to cells being dropped indiscriminately when the volume of network traffic is large. Other schemes involve "per connection" buffering where each logical connection (i.e., virtual path, virtual channel) is allocated its own cell memory. When the number of supported connections is large, however, the sum of the maximum buffer requirements for individual connections may drastically exceed the physical available memory.

If one large buffer resource is to be shared among a number of connections then, some form of buffer management must be employed. In the past, one solution has been to divide the buffer into a number of queues of fixed length and "hard allocate" capacity for each connection. The problem with this solution is that the fixed length queues offer no flexibility depending upon network traffic conditions. In addition, because of size and cost constraints, each queue would have to remain relatively small as a single switch may support thousands of logical connections. Those network connections with significant amounts of traffic would likely soon fill up their allotted queue and cell dropping would soon result. Another solution has been to oversubscribe the single memory resource and allow each connection to buffer up to a fixed maximum, but where the sum of all the connection maxima exceeds the memory capacity. This alternative relies on the fact that all connections are unlikely to require their maximum buffer space at the same time. Although this condition is true most of the time, it is inevitable that contention for buffer space will result at some point. Once contention does result, cells are dropped indiscriminately, i.e., without regard for whether a connection is already using a significant amount of buffer space or not. A third solution has been to reserve a minimum buffer allocation for each connection with the unallocated space available on a first-come-first-served basis. This allows each connection a guaranteed minimum buffer space. The problem with this solution is that where the number of logical connections runs into the thousands, a very large (i.e., expensive) common buffer is required for any reasonable minimum.

None of the buffer management schemes of the prior art have satisfactorily addressed the problem of per connection buffer management for large numbers of connections. Hence, it would be desirable to have a mechanism for effectively managing the oversubscription of a shared buffer resource.

SUMMARY AND OBJECTS OF THE INVENTION

It is therefore an object of the present invention to provide an improved method for managing the oversubscription of a common communications resource shared by a large number of traffic flows, such as ATM connections.

It is a further object of the present invention to provide an efficient method of buffer management at the connection level of a cell switching data communication network so as to minimize the occurrence of resource overflow conditions.

This and other objects of the invention are achieved by an effective method for managing oversubscription by dynamically changing the maximum buffer space allowed for a particular traffic flow or connection in response to the global utilization of a single buffer resource. A buffer utilization threshold for each of a number of various traffic flows is established. As new cells arrive, the global usage of the buffer resource is monitored. As the buffer fills, the individual thresholds for the various traffic flows are dynamically scaled based upon the global usage of the buffer. This method allows guaranteed buffer space for sensitive traffic flows despite the oversubscription. Aggressive buffer allocations are scaled back when necessary, thereby leaving space for traffic flows which are using only a small portion of their allocated buffer space. The present invention in effect maintains isolation between well behaved traffic flows, insuring that only flows which are using a disproportionate amount of memory are blocked from storing further cells or packets in the memory when the global resource usage approaches capacity.

In one embodiment, the thresholds are coded in mantissa and exponent form so that the scaling is accomplished by adjusting the exponent This approach allows a minimum of memory to be used to store the flow thresholds and simplifies the mechanism for scaling the thresholds.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An improved method and apparatus to efficiently manage a common communications buffer resource shared by a large number of traffic flows, such as a cell memory shared by ATM virtual channels or paths, is described. According to one embodiment, oversubscription of a shared buffer resource is managed by dynamically changing the maximum buffer space allowed for each traffic flow in response to the global utilization of a single shared buffer resource.

Upon review of this specification, those skilled in the art will appreciate that the methods and apparatus to be described are applicable at a number of levels. For example, the methods can be employed at the "per logical connection" level or at the "per quality of service" level, among others. To account for the numerous levels at which the present invention is applicable, the term "traffic flow" is used throughout this specification. Those skilled in the art will appreciate that this term describes the general nature of the levels at which the present invention is applicable. A presently preferred embodiment utilizes the invention at the per logical connection level in managing common buffer resources in ATM network nodes. In this particular case, a traffic flow is associated with the transport of cells on a single logical connection. The particular nature of this embodiment should not, however, be seen as limiting the more general nature and scope of the present invention as set forth in the appended claims.

In a fully integrated voice and data telecommunications network, a variety of switching nodes will be present. Each node is interconnected to other network nodes by a variety of transmission paths. The apparent capacity of these transmission paths is increased using virtual connections. In other words, rather than committing specific resources to a given source-destination pair, each node connects a source-destination pair only when information, in the form of a cell, is present. When cells are not being created for a given source-destination pair, the same network resources are used to transmit cells for other source-destination pairs. Cells are packets of fixed length and comprise both flow control (i.e., cell header) and payload information.

Any or each of the nodes in a telecommunications network may comprise a cell memory or buffer which is available to a number of traffic flows. These buffers may exist at various levels, for example, at the port level, the card level (where a single card supports multiple ports), the switch level, the class of service level, etc. As used hereafter, the term "per flow" is meant to include any or all situations where a single buffer resource is shared by a number of traffic flows, regardless of the level on which the sharing may occur.

Figure 1A:
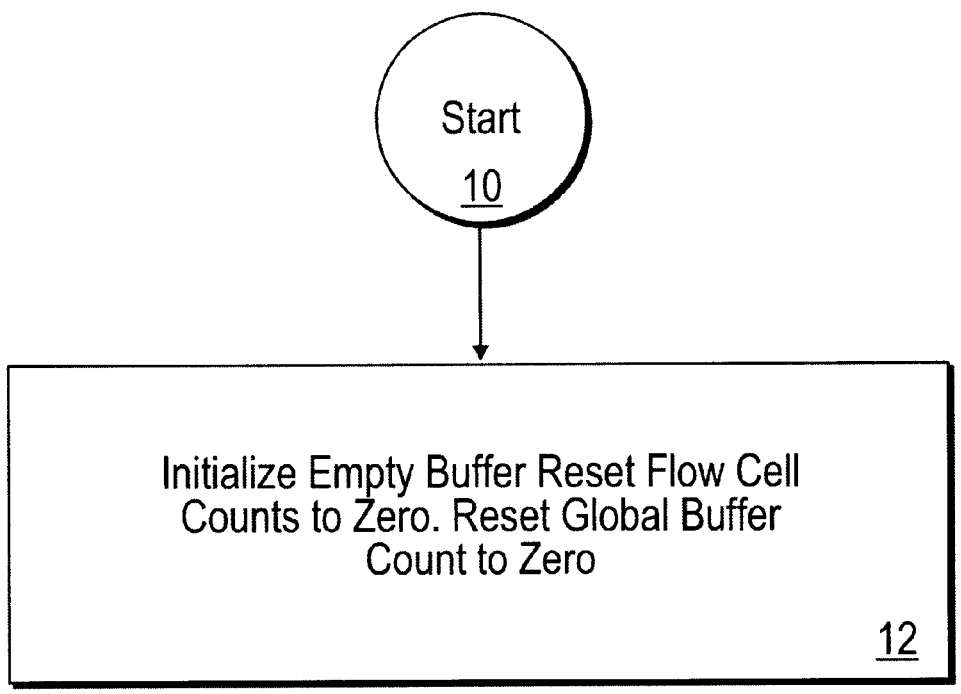
FIG. 1a is a flow diagram illustrating the initialization of various parameters according to one embodiment.

The basic operation for per flow buffer control according to the present invention is described with reference to FIGS. 1a–1c. As shown in FIG. 1a, an initialization procedure begins at step 10. At step 12, a shared buffer is initialized and a buffer count and flow cell counts are reset to zero. The use of these counts is described below.

Figure 1B:
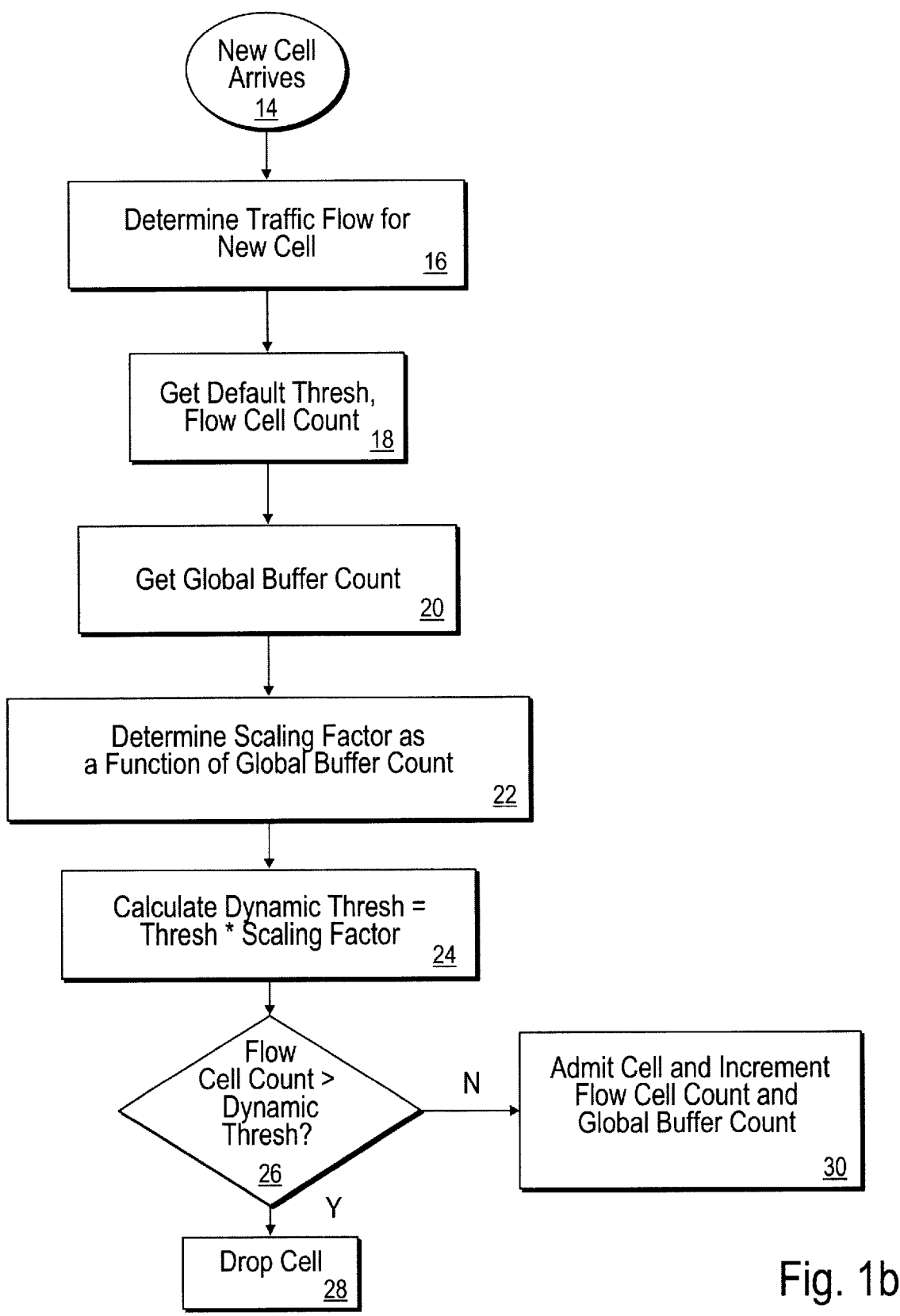
FIG. 1b is a flow diagram illustrating dynamic per traffic flow buffer management according to one embodiment.

FIG. 1b illustrates the operation of dynamic threshold scaling for a preferred embodiment. As a new cell arrives at step 14, the corresponding traffic flow is determined from the cell header information at step 16. The default threshold and buffer count for that flow are then retrieved from memory at step 18. The default threshold can be thought of as representing the maximum amount of buffer resources that a flow may use if no other flows are currently using the buffer. In other words, the default threshold represents the maximum number of cells a given flow may store in the buffer under the "ideal" condition where no other traffic flows or resources are using the buffer. These thresholds may be determined based on factors such as total available buffer size, customer requirements, traffic type, etc. The flow cell count represents the number of cells corresponding to the particular traffic flow of interest which are already stored in the buffer. At step 20, the total buffer utilization is determined. That is, the total number of cells from all traffic flows which are stored in the buffer is determined. Using the global buffer utilization from step 20 and the flow identification from step 16 as indices, a scaling factor for the flow threshold is retrieved from a lookup table stored in memory at step 22. The scaling factor is used to calculate the flow dynamic threshold in step 24 according to the following formula:

$$\text{Dynamic Thresh}_i = \text{Thresh}_i * SF_i$$

where:

Dynamic Thresh$_i$=the dynamic threshold for the $i^{th}$ traffic flow, Thresh$_i$=the default threshold for the $i^{th}$ traffic flow; and SF$_i$=the scaling factor for the $i^{th}$ traffic flow according to the global buffer utilization.

At step 26 a comparison is made to determine if the number of cells corresponding to the traffic flow of interest already stored in the buffer exceeds the dynamic threshold for that flow. If so, the process moves to step 28 and the new cell is dropped. Otherwise, the process moves to step 30 where the new cell is admitted and the buffer count for the flow of interest and the global buffer count are incremented.

Figure 1C:
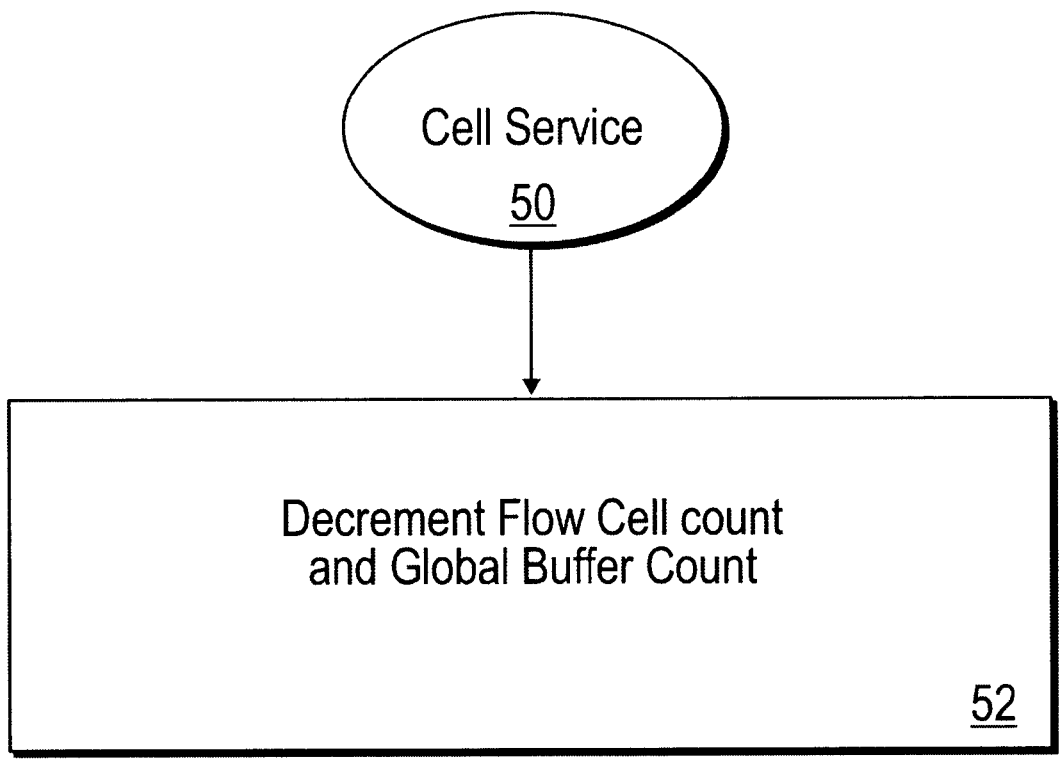
FIG. 1c is a flow diagram illustrating a cell service routine according to one embodiment.

As shown in FIG. 1c, when a cell departs the buffer, the corresponding flow cell count and the global buffer counts are decremented. In this way, current buffer counts are maintained at both the flow and global levels. The process of FIGS. 1a–1c is further described in detail with reference to FIGS. 2–6, below.

Figure 2:
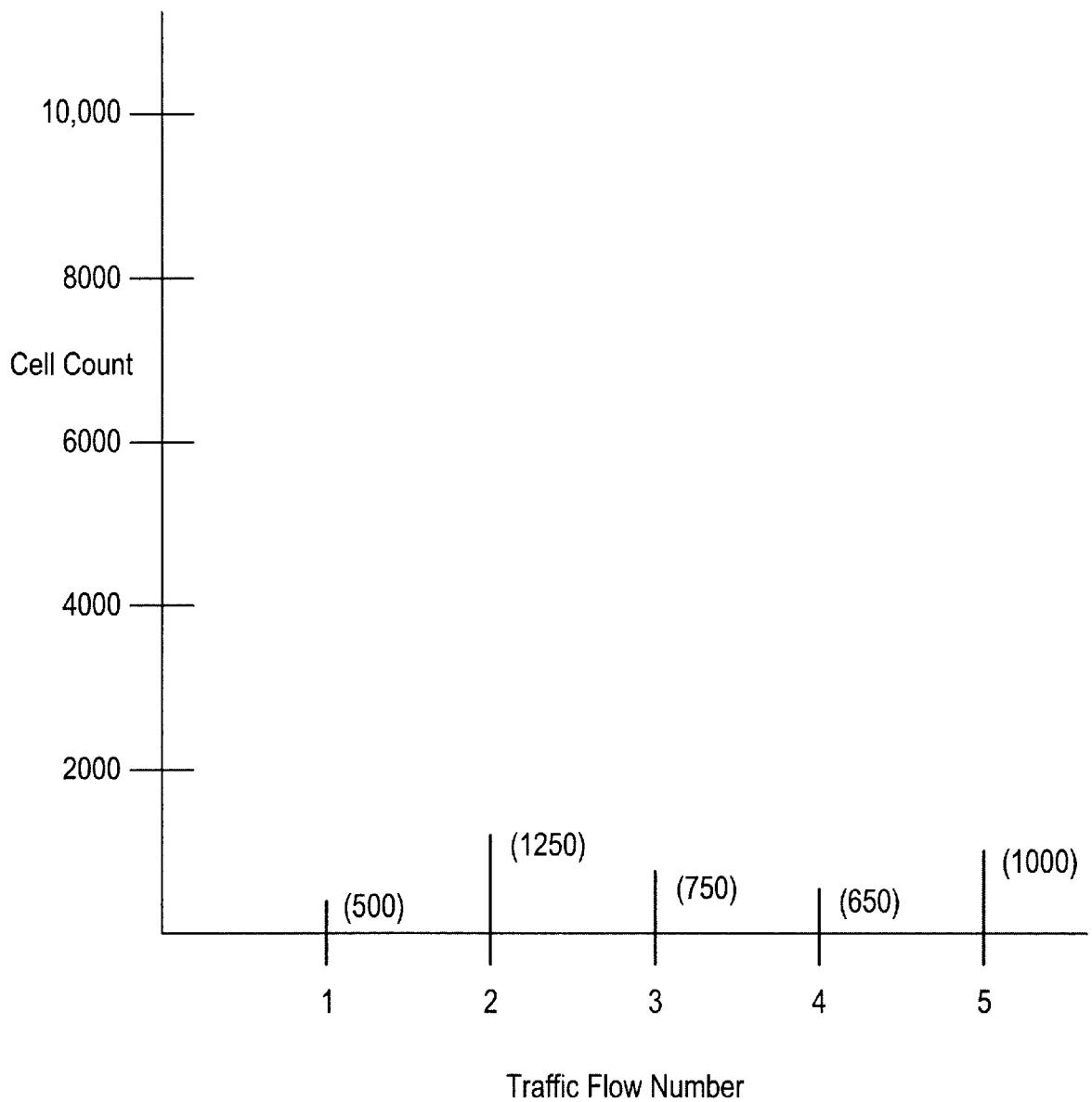
FIG. 2 is a plot which graphically illustrates the number of cells stored in a common buffer by each of a number of traffic flows.

Referring to FIG. 2, a graph depicting the common usage of a single buffer resource by a number of traffic flows is shown. The horizontal axis of the graph of FIG. 2 shows the traffic flows which are sharing the buffer. Although FIG. 2 shows only five flows sharing the single buffer, those skilled in the art will appreciate that this is for purposes of clarity and simplicity only and that the buffer management methods of the present invention are equally applicable to situations where any number of traffic flows share a single common buffer. The vertical axis of the graph shown in FIG. 2 is a count of the number of cells stored in the buffer by each flow. For the example shown in FIG. 2, traffic flow 1 has 500 cells stored, traffic flow 2 has 1250 cells stored, traffic flow 3 has 750 cells stored, traffic flow 4 has 650 cells stored and traffic flow 5 has 1000 cells stored. Thus, for example shown in FIG. 2, a total of 4150 cells are stored in the shared buffer.

Figure 3:
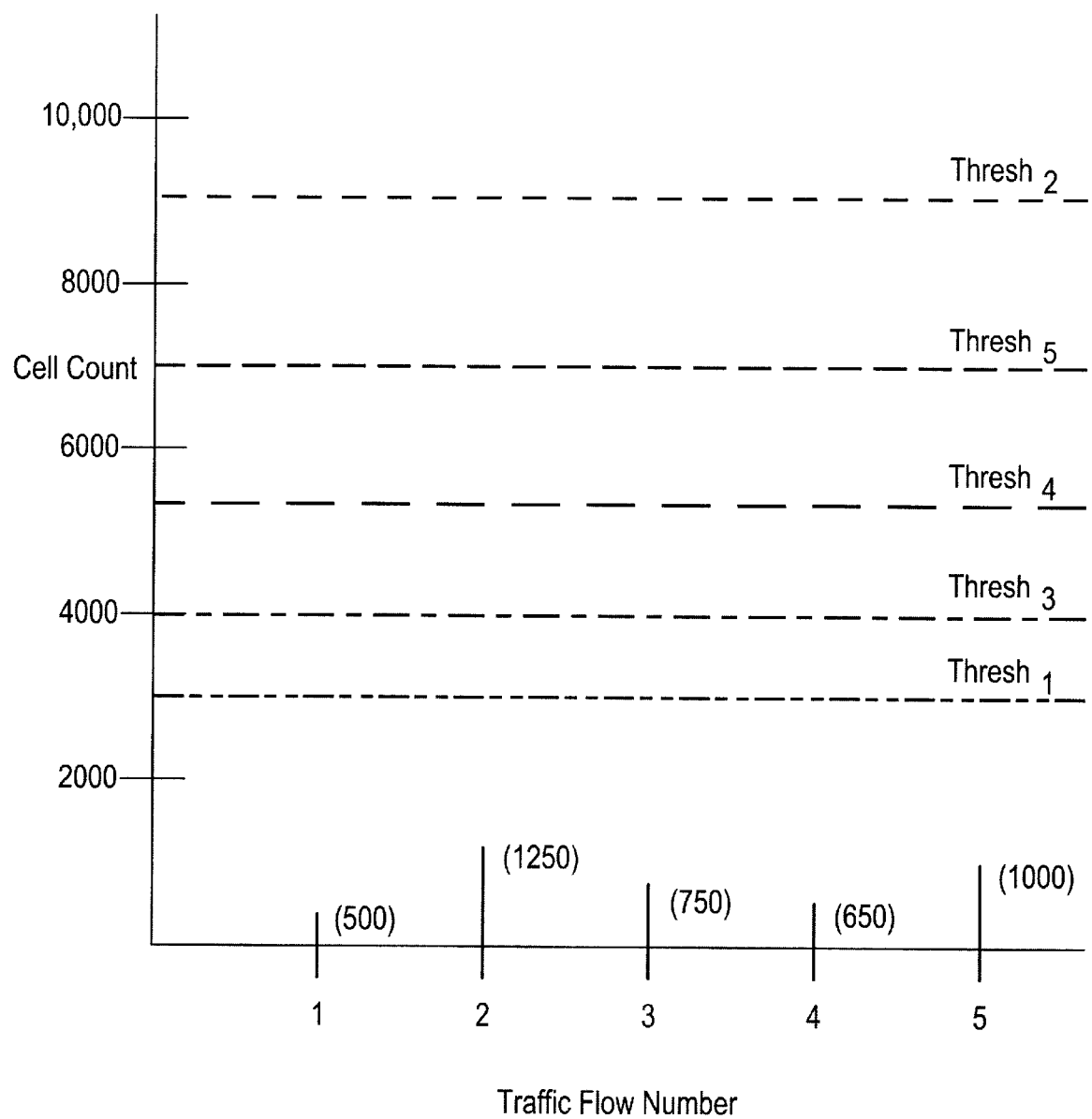
FIG. 3 is a plot similar to the plot shown in FIG. 2 that further shows a number of buffer thresholds corresponding to the various traffic flows sharing the common buffer.

FIG. 3 further illustrates the example begun in FIG. 2. Each flow has the same number of cells stored in the shared buffer as in FIG. 2. In FIG. 3, however, a number of default thresholds are shown. Each default threshold (Thresh$_1$ through Thresh$_5$) corresponds to a respective one of the traffic flows 1 through 5. For the example shown in FIG. 3, Thresh$_1$ is set at 3000 cells, Thresh$_2$ is set at 9000 cells, Thresh$_3$ is set at 4000 cells, Thresh$_4$ is set at 5000 cells and $Thresh_5$ is set at 7000 cells. As indicated above, the default thresholds represent the maximum amount of buffer resources that each particular flow may use if no other connections are currently using the buffer. The thresholds have been determined based on factors such as total available buffer size, customer requirements, traffic type, etc.

Figure 4:
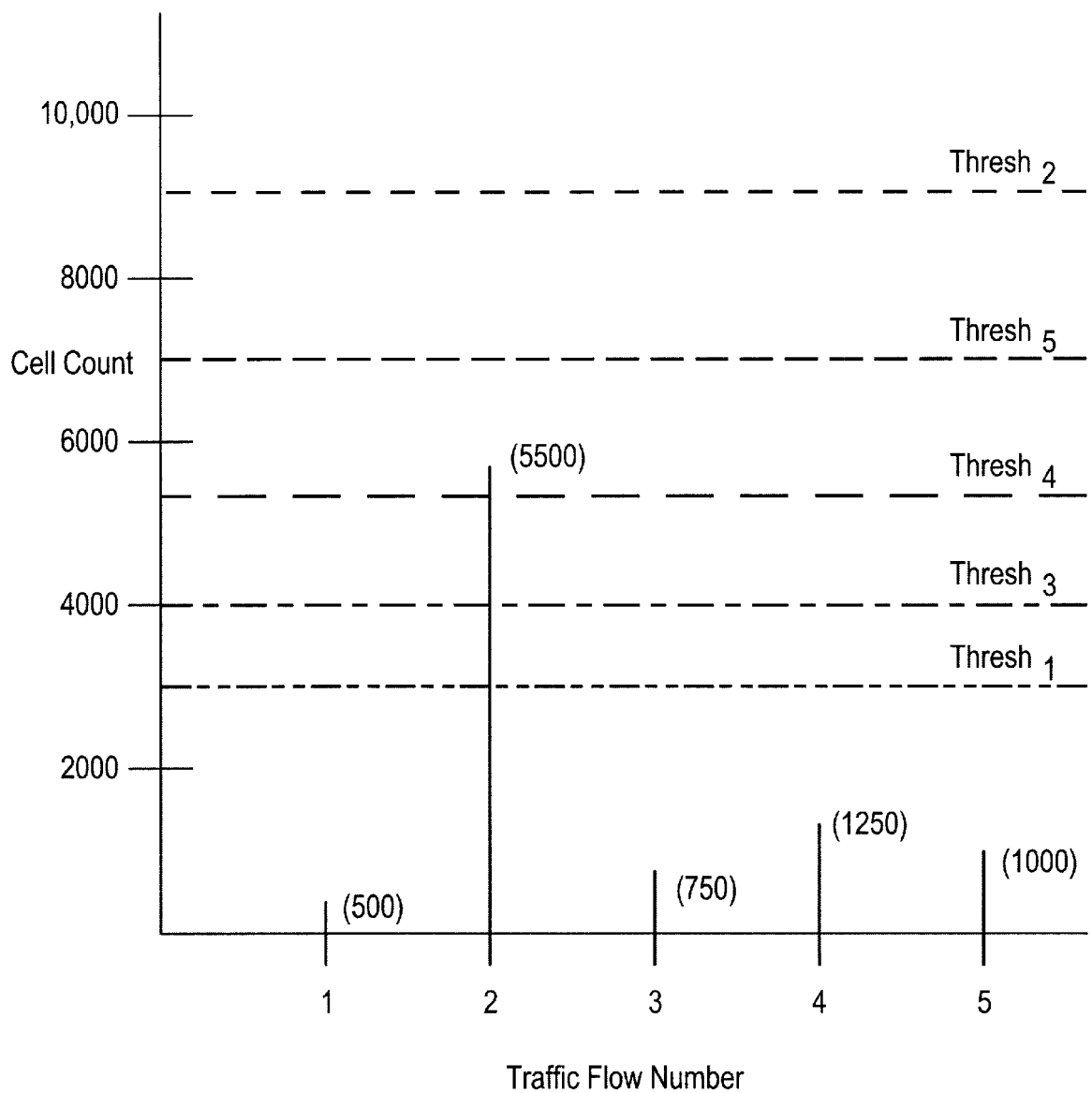
FIG. 4 is a plot similar to the plot shown in FIG. 3 and shows the common buffer utilization at a later time.

Referring now to FIG. 4, the graph of buffer utilization for the shared buffer is shown at a later point in time than was depicted in FIGS. 2 and 3. In the situation depicted in FIG. 4, flows 2 and 4 have added a number of cells to the common buffer. Traffic flow 2 now has 5,500 cells stored in the buffer and traffic flow 4 has 1250 cells stored in the buffer. Flows 1, 3 and 5 have neither added nor removed cells from the buffer. Thus, a total of 9000 cells are stored in the buffer for the instant of time shown in FIG. 4. If the common buffer is capable of storing a maximum of 10,000 cells total, for the example depicted in FIG. 4 the buffer is at 90% capacity.

Suppose now a new cell arrives. In accordance with the methods of the present invention, the new cell's corresponding traffic flow information is determined. For this example, suppose the new cell is associated with flow 2. The default threshold and buffer count for flow 2 are retrieved from memory. As shown in FIG. 4, $Thresh_2$ is 9000 cells and the global buffer count is 9000 cells (i.e., 90% of capacity). Using the global buffer utilization, the appropriate scaling factor for the flow 2 threshold is retrieved from a lookup table stored in memory. For this example, suppose the flow 2 threshold is to be scaled back to one-half of its default value when global buffer utilization reaches 90% of capacity (the very situation depicted in FIG. 4). Thus, the Dynamic $Thresh_2$ based on the current buffer utilization is ½*9000= 4500 cells. This;is graphically illustrated in FIG. 5.

Figure 5:
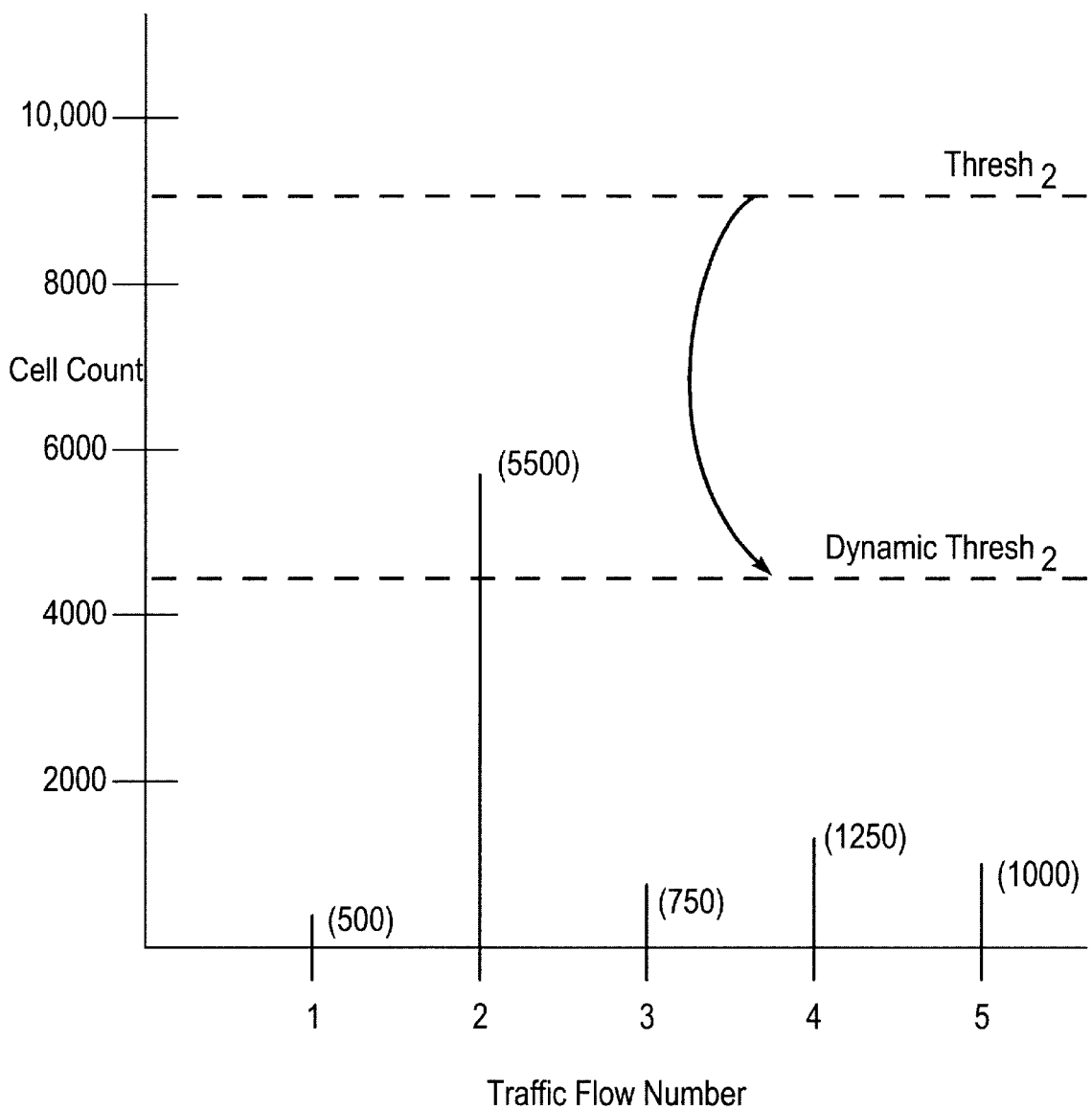
FIG. 5 is a plot similar to the plot shown in FIG. 4 and illustrates the effect of dynamic buffer threshold scaling for one traffic flow according to one embodiment.

The decision on whether to admit the new cell for flow 2 is now based on the dynamically scaled threshold for flow 2. As shown in FIG. 5, flow 2 is already storing 5500 cells in the common buffer. This exceeds the dynamically scaled threshold for this flow (which is 4500 cells for the depicted buffer utilization condition). As a result, the new cell is dropped.

Suppose now a new cell corresponding to traffic flow 1 arrives. The buffer utilization has not changed from the situation depicted in FIGS. 4 and 5. Flow 1 still stores 500 cells, flow 2 is storing 5500 cells, flow 3 is storing 750 cells, flow 4 is storing 1250 cells and flow 5 is storing 1000 cells. Thus, buffer utilization remains at 90% of capacity. Also, recall that the default threshold for flow 1 is 3000 cells, as shown in FIG. 3.

As the new cell for flow 1 arrives, the default threshold (3000 cells) and current buffer count (500 cells) for flow 1 are retrieved from memory. Using the global buffer utilization (90%), the appropriate scaling factor for the flow 1 threshold is retrieved from the lookup table stored in memory. For this example, suppose that like flow 2, the flow 1 threshold is to be scaled back to one-half of its default value when global buffer utilization reaches 90% of capacity. Thus, the Dynamic Thresh, based on the current buffer utilization is ½*3000=1500 cells. This is graphically illustrated in FIG. 6.

Figure 6:
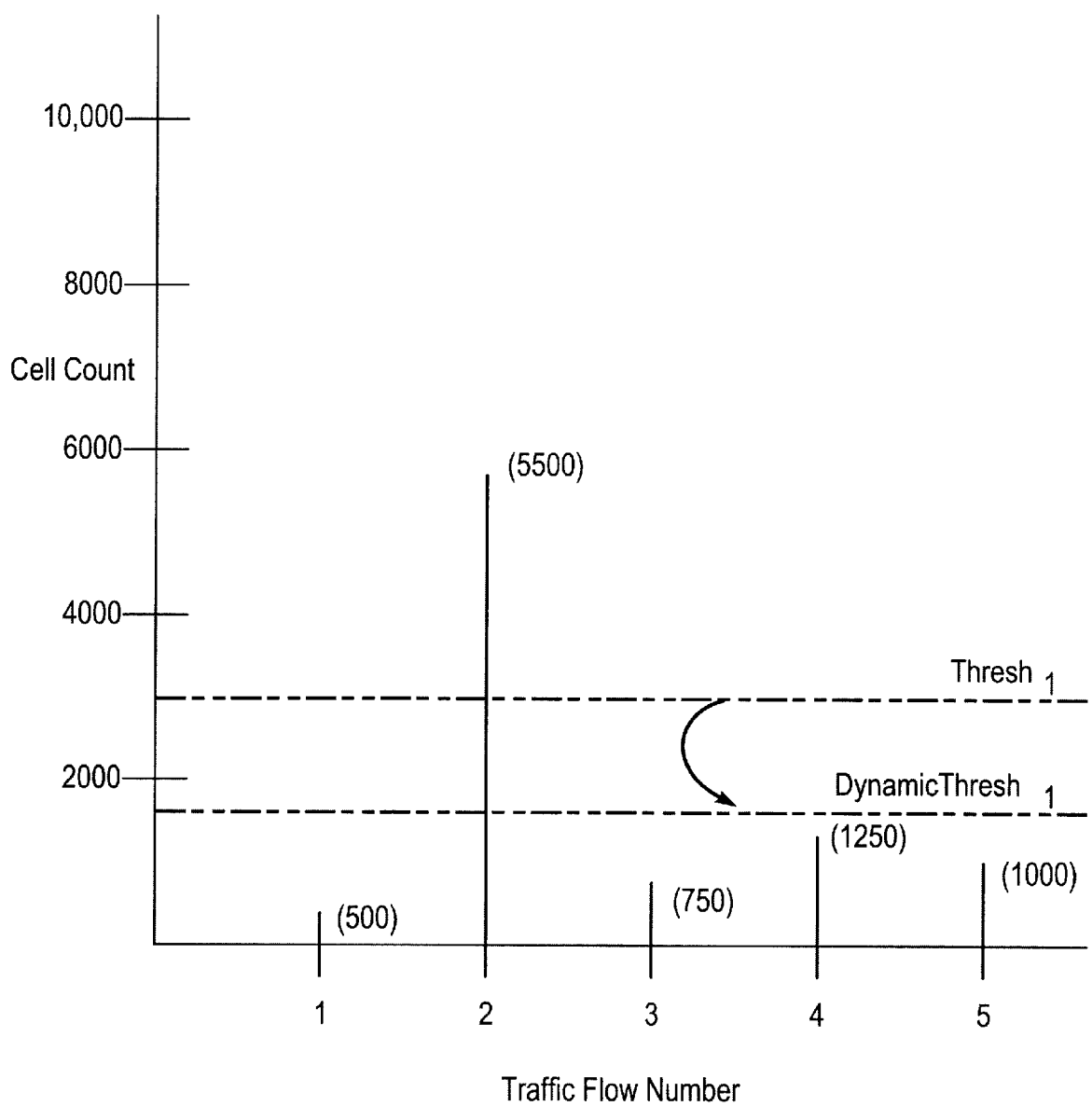
FIG. 6 is a plot similar to the plot shown in FIG. 4 and illustrates the effects of dynamic buffer threshold scaling for a different traffic flow according to one embodiment.

The decision on whether to admit the new cell for flow 1 is now based on the dynamically scaled threshold for flow 1. As shown in FIG. 6, flow 1 is only storing 500 cells in the common buffer. This is less than the number of cells permitted by the dynamically scaled threshold for this flow. As a result, the new cell is admitted to the buffer and the global buffer count and flow 1 buffer count are incremented.

The above examples illustrate how dynamic scaling penalizes only those flows which are using significant portions of their allocated buffer space. Flow 2 was using a significant portion of its allocated capacity (5500 out of 9,000). As the buffer reached the 90% full level, dynamic scaling was employed and flow 2 was not permitted to store any more cells. Under these conditions, flow 2 would not be allowed to store any more cells until global buffer utilization had declined. On the other hand, given the same buffer utilization (90% of capacity), flow 1, which was storing only 500 cells (⅙ of its configured maximum), was permitted to store another cell. Note also that although flow 2 was using a significant amount of buffer space, dynamic scaling only affected newly arriving cells. That is, although flow 2 was already storing more cells (5500) than would otherwise be permitted according to the dynamically scaled threshold (4500), no previously stored cells were discarded.

It will be appreciated that different scaling tables can be provided for different traffic flows. For instance, scaling Class 1 might be used for UBR traffic, Class 2 might be for ABR traffic and Classes 3 and 4 used for more sensitive traffic such as VBR and CBR. Table 1 shows some exemplary settings, although it will be appreciated that other scaling factors could be used. The per flow thresholds for ABR and UBR traffic are likely to be set aggressively high as these classes can tolerate scaling back early. Other traffic types (such as CBR and VBR) would generally have smaller per flow thresholds but would be more sensitive to scaling back.

TABLE 1

| Buffer Utilization | Scaling Factor Class 1 | Scaling Factor Class 2 | Scaling Factor Class 3 | Scaling Factor Class 4 |
|---|---|---|---|---|
| <90% | 1 | 1 | 1 | 1 |
| 90% | 1/2 | 1 | 1 | 1 |
| 91% | 1/4 | 1 | 1 | 1 |
| 92% | 1/8 | 1/2 | 1 | 1 |
| 93% | 1/16 | 1/4 | 1 | 1 |
| 94% | 1/32 | 1/8 | 1 | 1 |
| 95% | 1/64 | 1/16 | 1 | 1 |
| 96% | 1/256 | 1/32 | 1/2 | 1 |
| 97% | 1/1024 | 1/64 | 1/2 | 1 |
| 98% | 1/4096 | 1/256 | 1/4 | 1 |
| 99% | 1/16384 | 1/16384 | 1/4 | 1 |

The 1% increments, the starting value of 90%, and the scaling fractions are all examples only. The contents of the table are, in general, configurable. For example, to provide a safety margin for CBR and VBR queues, it may be desirable to move the scale table lower, that is, replacing the 9X % with 8X % or 7X %. Also, the scaling factors can be made user selectable based on network conditions and/or requirements.

Limiting the scaling factors to binary fractions can drastically simplify the implementation. In such an embodiment, the thresholds are preferably stored in a format having a 4-bit mantissa (M) and a common 4-bit exponent (E). The linear threshold (T) is calculated as $T=M \times 2^E$. Thus, the scaling can be easily achieved by adjusting the exponent such that $T=M \times 2^{E-A}$) where A is obtained from Table 1 (in other words, Table 1 would actually store the adjustment A={0,1, 2, 3 ... } rather than the fraction {1,½, ¼, ⅛ .... })

It will be appreciated that the dynamic threshold scaling method has several performance advantages over existing techniques. For example, the method is scalable to a large number of traffic flows and for a large number of per flow queues. Sensitive traffic flows can be isolated from "memory hogs". The method further ensures "fair" allocation of resources between flows in the same scale and class. Note that "fair" does not necessarily mean equal (at 90% buffer utilization, flow 2 was permitted to store 4500 cells while flow 1 was only allowed 1500), rather, resource allocation may be determined by individual customer needs. Dynamic scaling further allows preferential treatments of groups of traffic flows via the selection of scaling classes. Global resource overflows are avoided and, hence, the performance degradation that accompanies these events is avoided.

Storing the thresholds associated with the flow in the form of separate mantissas with a shared exponent drastically reduces the memory which would otherwise be required to store these thresholds. A conventional approach would require 20 bits per threshold per flow. The preferred method, however, requires just 20 bits to store all the thresholds (assuming a 4-bit representation). This makes a significant difference when the number of flows is large. Furthermore, it reduces the processing bandwidth because the buffer count comparisons share a common exponent test and a simple 4-bit mantissa comparison.

In addition to maximum threshold discard control as described above, a number of other options can be supported using the methods of the present invention. For example, decisions on whether to discard cells which have their cell loss priority (CLP) bits set or decisions on whether to use EFCI congestion control can be made according to dynamically scaled thresholds. Such implementations are discussed below.

Typically, each node in a network maintains information regarding each traffic flow (e.g., VP and/or VC) it supports. To implement per flow dynamic scaling management options, additional information would be maintained by these nodes. Then, for each cell, the cell header is used to generate a flow indicator that indexes a lookup table that contains information regarding the traffic flow of interest. The lookup table may be stored in a memory associated with the network node of interest and would store a number of thresholds which could be dynamically scaled.

As an example, consider the case where a CLP threshold is to be scaled. In such an embodiment, cells which have their CLP bits set (CLP=1) will be discarded when the buffer count for the traffic flow of interest exceeds the CLP threshold. The CLP thresholds can be dynamically scaled according to the procedure described above.

As another example, consider the case of frame discard. In many applications, data is sent in frames. In such cases, once one cell is lost, the rest of the cells in the frame are not useful. "Goodput" can therefore be improved by discarding the remaining cells in the frame. A single bit per flow (frame discard enable bit) could be used to enable this feature.

In this case, logic associated with the node containing the common buffer would keep track of end-of-frame (EOF) indicators in arriving cells. In this way, frames could be distinguished. Various state information determined from the EOF indicators and a dynamically scaled early packet discard threahold could then be used to trigger frame discarding.

Per flow buffer management can also be used to set the EFCI bit in cell headers to allow for the use of other congestion management processes. The EFCI threshold is checked as cells are serviced. If the buffer count for the traffic flow of interest is greater than the EFCI threshold for that flow, the EFCI bit in the cell header set Again, the EFCI threshold can be dynamically scaled according to the above described process.

Thus, an efficient method for managing a common communications buffer resource shared by a large number of traffic flows (e.g., processes or connections) has been described. In the foregoing specification, the invention has been described with reference to specific exemplary embodiments thereof. It will, however, be clear that various modifications and changes may be made thereto without departing from the broader spirit and scope of the invention as set forth in the appended claims. For example, those skilled in the art will appreciate that the common buffers described in the specification may exist at a variety of levels within a network switch node. This includes the port level, card level, switch level, etc. Also, exemplary thresholds of interest, such as maximum cell discard thresholds, CLP thresholds, EPD thresholds and EFCI thresholds have been discussed. Although discussed separately, those skilled in the art will recognize that the buffer count checks for each of these thresholds may be performed simultaneously or in various groupings according to user and network requirements. Further, these are only examples of the types of thresholds which might be dynamically scaled. Those skilled in the art will recognize that a number of other thresholds may be dynamically configured to achieve desired traffic management in a data communications network. The specification and drawings are, accordingly, to be regarded in an illustrative rather than a restrictive sense.

What is claimed is:

1. A method comprising:
   establishing, for each of a plurality of processes sharing a common buffer resource, corresponding buffer utilization thresholds, each of said buffer utilization thresholds representing a predetermined maximum amount of said common buffer resource that the corresponding process may use; and
   dynamically adjusting a first buffer utilization threshold corresponding to a first process of said plurality of processes according to the usage of said common buffer resource by all of said plurality of processes.

2. A buffer management process for a cell switching communications network having a first node, said first node having a common buffer being shared by a plurality of network connections including a first connection, the process comprising:
   receiving a first cell at said first node, said first cell being associated with said first connection;
   determining a buffer count for said common buffer, said buffer count representing a current utilization of said common buffer by said plurality of connections;
   establishing a first connection threshold for said first connection according to a predetermined maximum amount of said common buffer that said first connection may use and said buffer count; and
   determining whether said first cell will be accommodated in said common buffer using said first connection threshold.

3. A buffer management system for congestion prevention in a cell switching communications network comprising a plurality of logical connections, the buffer management system comprising:
   a first node receiving network traffic transmitted over said plurality of logical connections, said first node having a common buffer shared by said plurality of logical connections and further having a buffer control device, said buffer control device monitoring the usage of said common buffer by said plurality of logical connections and dynamically scaling a buffer utilization threshold according to a predetermined maximum amount of said common buffer that a corresponding first one of said plurality of logical connections may use and said usage.

4. A node for a cell switching communications network, the node comprising:

a lookup table stored in a memory, said lookup table comprising buffer threshold scaling factors to be used to determine whether or not to admit a cell of a first of a plurality of traffic flows transmitted within said cell switching communications network to a common buffer shared by said plurality of traffic flows, said buffer threshold scaling factors arranged according to a predetermined maximum amount of the common buffer that the first of said plurality of traffic flows may use and the total usage of the common buffer by all of the plurality of traffic flows.

5. An apparatus, comprising:

means for establishing, for each of a plurality of processes sharing a common buffer resource, corresponding buffer utilization thresholds, each of said buffer utilization thresholds representing a predetermined maximum amount of said common buffer resource that the corresponding process may use; and means for dynamically adjusting a first buffer utilization threshold corresponding to a first process of said plurality of processes according to the usage of said common buffer resource by all of said plurality of processes.

6. The apparatus of claim 5, wherein the means for dynamically adjusting comprises means for scaling said first buffer utilization threshold by a first scaling factor determined according to said usage of said common buffer resource.

7. The apparatus of claim 5, further comprising means for representing said buffer utilization threshold.

8. An apparatus, comprising:

means for receiving a first cell at a first node, said first cell being associated with a first connection;

means for determining a buffer count for a common buffer, said buffer count representing a current utilization of said common buffer by a plurality of network connections;

means for establishing a first connection threshold for said first connection according to a predetermined maximum amount of said common buffer that said first connection may use and said buffer count; and means for determining whether said first cell will be accommodated in said common buffer using said first connection threshold.

9. The apparatus of claim 8, wherein the means for establishing the first connection threshold comprises:

means for establishing an initial connection threshold corresponding to said predetermined maximum amount of said common buffer that said first connection may use; and means for dynamically adjusting said initial connection threshold according to said buffer count, said dynamic adjusting producing a first scaled threshold.

10. The apparatus of claim 9, wherein the means for determining whether said first cell will be accommodate comprises:

means for establishing a connection cell count, the connection cell count indicating the number of cells associated with the first connection stored in said common buffer;

means for comparing said connection cell count to said first scaled threshold, and wherein the apparatus further comprises means for denying admittance of said first cell to said common buffer if said connection cell count exceeds said first scaled threshold.

* * * * *